United States Patent
Mendlovic et al.

(10) Patent No.: US 12,373,528 B2
(45) Date of Patent: Jul. 29, 2025

(54) DYNAMIC IDENTITY AUTHENTICATION

(71) Applicant: Ramot at Tel-Aviv University Ltd., Tel-Aviv (IL)

(72) Inventors: David Mendlovic, Tel Aviv (IL); Menahem Koren, Tel Aviv (IL); Lior Gelberg, Tel Aviv (IL); Khen Cohen, Tel Aviv (IL); Mor-Avi Azulay, Tel Aviv (IL); Ohad Volvovitch, Tel Aviv (IL)

(73) Assignee: Ramot at Tel-Aviv University Ltd., Tel Aviv (IL)

( * ) Notice: Subject to any disclaimer, the term of this patent is extended or adjusted under 35 U.S.C. 154(b) by 0 days.

(21) Appl. No.: 18/042,210

(22) PCT Filed: Jul. 30, 2021

(86) PCT No.: PCT/IL2021/050925
§ 371 (c)(1),
(2) Date: Feb. 18, 2023

(87) PCT Pub. No.: WO2022/038591
PCT Pub. Date: Feb. 24, 2022

(65) Prior Publication Data
US 2023/0306094 A1 Sep. 28, 2023

Related U.S. Application Data

(60) Provisional application No. 63/067,890, filed on Aug. 20, 2020.

(51) Int. Cl.
*G06F 21/32* (2013.01)
*G06V 40/10* (2022.01)
(Continued)

(52) U.S. Cl.
CPC .......... *G06F 21/32* (2013.01); *G06V 40/117* (2022.01); *G06V 40/1353* (2022.01); *G06V 40/176* (2022.01)

(58) Field of Classification Search
CPC ..... G06F 21/32; G06F 21/316; G06V 40/117; G06V 40/1353; G06V 40/176;
(Continued)

(56) References Cited

U.S. PATENT DOCUMENTS 6,535,620 B2 *  3/2003  Wildes ............... G06T 7/262
                                                  382/107
8,441,749 B2   5/2013  Brown et al.
(Continued)

FOREIGN PATENT DOCUMENTS

CN   104156650 A    11/2014
CN   110909621 A *   3/2020
(Continued)

OTHER PUBLICATIONS

International Search Report and Written Opinion in related PCT application PCT/IL2021/050925, dated Nov. 21, 2021.
(Continued)

*Primary Examiner* — Aubrey H Wyszynski
(74) *Attorney, Agent, or Firm* — Nathan & Associates Patent Agents Ltd.; Menachem Nathan

(57) ABSTRACT

A method of identifying a person, the method comprising: acquiring spatiotemporal data for each of a plurality of anatomical landmarks associated with an activity engaged in by a person that defines a spatiotemporal trajectory of the anatomical landmark during the activity; modeling the acquired spatiotemporal data as a spatiotemporal graph (ST-Graph); and processing the ST-Graph using at least one non-local graph convolution neural network (NLGCN) to provide an identity for the person.

18 Claims, 6 Drawing Sheets

(51) Int. Cl.
*G06V 40/12* (2022.01)
*G06V 40/16* (2022.01)

(58) Field of Classification Search
CPC ........ G06V 10/22; G06V 10/25; G06V 10/82;
G06V 10/84; G06V 40/1371; G06V
40/171; G06V 40/174; G06V 40/28;
G06V 40/70; G06V 20/49; G06V 40/23;
G06N 3/045; G06N 3/0464; G06T
2207/10016
USPC ............................................................ 726/4
See application file for complete search history.

(56) References Cited

U.S. PATENT DOCUMENTS

| | | | |
|---|---|---|---|
| 11,423,660 B2* | 8/2022 | Luk-Zilberman | B60K 35/00 |
| 11,531,393 B1* | 12/2022 | Weng | A61B 5/7264 |
| 2018/0341766 A1* | 11/2018 | Anagnostopoulos | G06V 40/20 |
| 2021/0055737 A1* | 2/2021 | Saleem | G06V 10/82 |
| 2021/0309181 A1* | 10/2021 | Kale | G06V 40/172 |
| 2021/0357647 A1* | 11/2021 | Na | G06N 3/045 |

FOREIGN PATENT DOCUMENTS

| | | | | |
|---|---|---|---|---|
| CN | 111444488 A | | 7/2020 | |
| CN | 111339942 B | * | 7/2022 | ......... G06K 9/00335 |
| JP | 2017049867 A | | 3/2017 | |
| TW | I756191 B | * | 3/2022 | |
| WO | 2018228218 A1 | | 12/2018 | |

OTHER PUBLICATIONS

Two-Stream Adaptive Graph Convolutional Networks for Skeleton-Based Action Recognition, in: Proceedings of the IEEE/CVF conference on computer vision and pattern recognition; p. 12026-12035; Jun. 15-20, 2019.
Office Action in related JP patent application 2023-511812, dated Jul. 18, 2023.
Office Action in related KR patent application 2023-7040473, dated Dec. 8, 2024.
Office Action in related JP patent application 2024-029663, dated Dec. 26, 2024.
Hiroki Shimokubo, Eisuke Kita, "Walking Motion Using Kinect Personal authentication", IPSJ Technical Report,Japan, Information Processing Society, Dec. 2, 2014, vol. 2014-MPS-101, No. 11,pp. 1-2.
Takuhiro Kimura, 3 Outside, "Multimo using gait, head, and height—Dal Appraisal System", IEICE Trans. A, Japan, IEICE, Dec. 1, 2015, J98-A, No. 12, pp. 659-663.
Gentiane Venture , "Human Characterization and Emotion Characterization from Gait", 2010 Annual International Conference of the IEEE Engineering in Medicine and Biology, USA, IEEE, Aug. 31, 2010, pp. 1292-1295.

* cited by examiner

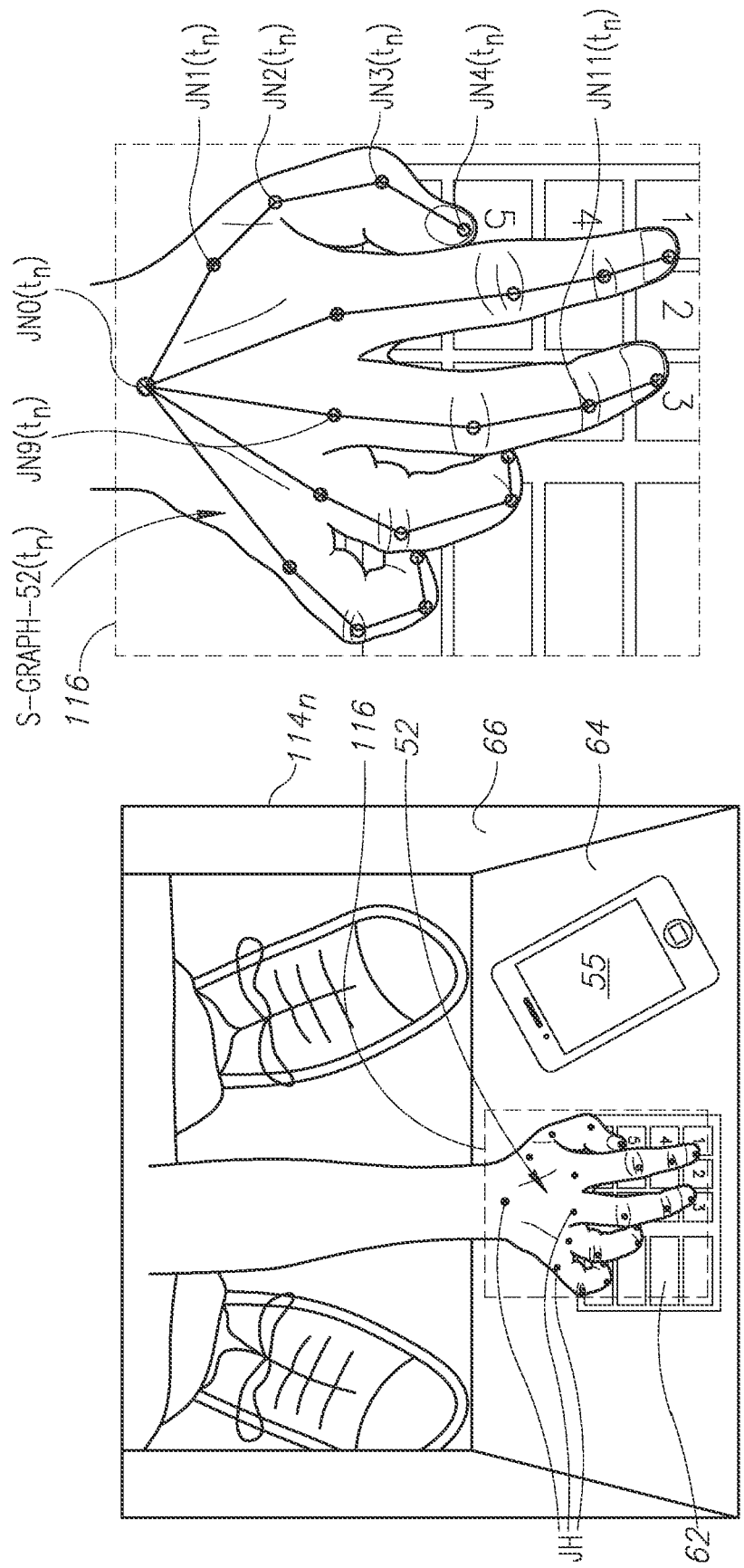

DYNAMIC IDENTITY AUTHENTICATION

RELATED APPLICATIONS

The present application is a 371 application from international patent application PCT/IL2021/050925 filed on Jul. 30, 2021, which claims the benefit under 35 U.S.C. 119(e) of U.S. Provisional Application 63/067,890, filed on Aug. 20, 2020, the disclosure of which is incorporated herein by reference.

FIELD

Embodiments of the disclosure relate to methods and apparatus for providing biometric authentication of a person's identity.

BACKGROUND

An ever increasing list of services require an authentication procedure conventionally referred to as a multi-factor authentication procedure (MFA) to authenticate and authorize a user access to the services. In an MFA procedure a user is required to provide an appropriate response to a challenge for each of a plurality of categories of challenges. The challenge categories are referred to as "authentication factors". A common MFA is referred to as a two-factor authentication (2FA) in which a user is challenged to correctly respond to at least two of three authentication factors: a knowledge factor, which tests something the user is supposed to know, for example a password; a possession factor, which requires presentation of something the user is expected to have, for example a credit card or smartphone; and an inherence factor, which requires that the user present something that characterizes the user, for example, a biometric feature such as a fingerprint, voiceprint, or iris scan.

However, legacy authentication technology appears to be encountering difficulties in enabling ease of use and providing quality of authentication required by the increasing complexity and interdependence of the matrix of activities regularly engaged in by a modern citizen. For example, legacy MFA configurations appear hard pressed to satisfy the Strong Customer Authentication (SCA) specifications of the revised European Payment Services Directive (PSD2) promulgated to integrate consumers, banks, and third party providers (TPP) in the open banking initiative. Implementation of SCA has been delayed twice. Originally scheduled to be instituted in September 2019, institution was delayed to Mar. 14, 2021, and then again to the presently scheduled deadline of Sep. 14, 2021.

SUMMARY

An aspect of an embodiment of the disclosure relates to providing a method, which may be referred to as a dynamic identification (DYNAMIDE) method, or simply DYNAMIDE, for identifying a person based on idiosyncrasies of a manner in which the person performs an activity. In accordance with an embodiment of the disclosure DYNAMIDE comprises identifying anatomical landmarks, optionally referred to as activity fiducials (AFIDs), that exhibit various degrees of motion, or lack thereof, during activities performed by people and whose spatiotemporal trajectories during performances of the activities may be used to identify the activities. DYNAMIDE comprises processing the trajectories to determine features of the trajectories that are advantageous for distinguishing the activities by the individuals performing the activities and in identifying the particular individuals performing the activities.

Features of an activity that may distinguish the activity by an individual performing the activity may be highly nuanced and the AFID trajectories associated with the activity may exhibit substantial subtle and nonintuitive crosstalk. As a result, a feature of one spatiotemporal trajectory of an activity that may intuitively appear unrelated to features of another spatiotemporal trajectory of the activity may in fact be idiosyncratic to the individual performing the activity and provide a basis for identifying the individual. In accordance with an embodiment of the disclosure to provide a spatiotemporal resolution advantageous for discovering and using idiosyncrasies exhibited by the trajectories for identification, spatial and/or temporal processing of the trajectories may be nonlocal and a number of apriori processing constraints assumed for motion exhibited by AFID trajectories advantageously limited.

In accordance with an embodiment identifying a particular individual based on a given activity that the individual may perform comprises acquiring a sequence of images of the individual performing the given activity and identifying in the images AFIDs associated with the given activity. The images may be processed to determine spatiotemporal trajectories exhibited by the identified AFIDs and the trajectories processed to identify the particular individual who performed the activity from among a plurality of individuals who may have performed the activity. Optionally, processing the AFID trajectories comprises determining local and nonlocal spatiotemporal correlations that the AFIDs exhibit during performance of the given activity and using the correlations to determine the identity of the particular individual. A spatiotemporal correlation may comprise a correlation based on a spatial parameter, a temporal parameter, or both spatial and temporal parameters characterizing a spatiotemporal trajectory or trajectories of the AFID or AFIDs.

An AFID associated with a given activity may be an anatomical landmark of any body part, such as a limb, the face, or the head that exhibits a spatiotemporal trajectory in performance of the given activity suitable for use in identifying a person performing the activity in accordance with an embodiment of the disclosure. For example, an AFID may be a joint or skeletal bone of a limb that exhibits a suitable spatiotemporal trajectory during such activities as for example walking, driving a golf ball, or typing a password at an ATM. For typing, AFIDS may comprise a plurality of joints at which bones of the hand are connected. An AFID may be a facial landmark, such as the brow, eyes, and lip corners, whose motions are used to define the action units (AUs) of the facial action coding system (FACS) used to taxonomize facial expressions and micro-expressions. AFIDs may also be minutia pair features of fingerprints of a plurality of fingers of a hand, contactless imaged at sufficient optical resolution to enable identification of the minutia pairs.

In accordance with an embodiment, DYNAMIDE uses at least one neural network to process images of an activity to identify an individual performing the activity. In an embodiment the at least one neural network is trained to detect body parts or regions of interest (BROIs) in the images and identify AFIDs they may comprise. The space and time development of the identified AFIDs during performance of the activity are represented by a spatiotemporal graph (ST-Graph) in which the AFIDs are nodes connected by spatial and temporal edges that define the activity's spatiotemporal AFID trajectories. The at least one neural network may comprise at least one graph convolutional network (GCN)

for processing the trajectories and classifying activities according to individuals performing the activities.

In an embodiment the at least one GCN comprises a nonlocal neural network (NLGCN) having at least one nonlocal neural network block for processing the AFID spatiotemporal trajectories. The at least one nonlocal neural network block may comprise at least one spatial nonlocal neural network block and/or at least one temporal nonlocal neural network block. Optionally, the NLGCN is configured as a multi-stream GCN comprising a plurality of component NLGCNs that operate to process sets of data characterized by independent degrees of freedom based on the AFID trajectories. In an embodiment, an output of the multi-stream GCN may comprise a weighted average of the outputs of each of the component GCNS.

By way of example for a DYNAMIDE configured to identify individuals by the way they type, AFIDs which are joints of the hand are characterized by motion degrees of freedom (for example, distances between joints of different fingers) that are independent of motion degrees of freedom available to AFIDs that are bones of the hand connecting the joints. In an embodiment the DYNAMIDE may therefore comprise a two-stream 2s-NLGCN multi-stream GCN having two component NLGCNs. One of the two component NLGCNs processes joint AFIDs and the other component NLGCN processes bone AFIDs. In an embodiment the joint NLGCN comprises at least one learnable, "adaptive", adjacency matrix that is substantially data driven to reduce a number of apriori constraints that may be used to configure the 2s-NLGCN. A 2s-NLGCN comprising an adaptive adjacency matrix in accordance with an embodiment of the disclosure may be referred to as an adaptive 2s-NLGCN (2s-ANLGCN). The outputs of the joint and bone NLGCNs of a 2s-NLGCN or 2s-ANLGCN of the typing DYNAMIDE may be fused to identify an individual.

In accordance with an embodiment, identifying the particular individual is done in real time. Real time identification in accordance with an embodiment refers to identification of an individual while the individual is performing the activity or within a timeframe for which quality of experience (QoE) of a service for which identification is performed is not substantially degraded by the identification process.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the invention are described below with reference to figures attached hereto that are listed following this paragraph. Identical features that appear in more than one figure are generally labeled with a same label in all the figures in which they appear. A label labeling an icon representing a given feature of an embodiment of the invention in a figure may be used to reference the given feature. Dimensions of features shown in the figures are chosen for convenience and clarity of presentation and are not necessarily shown to scale

FIG. 4A schematically shows an enlarged image of a video frame from the sequence of video frames acquired for the person engaged in typing at the ATM shown in FIG. 2, in accordance with an embodiment of the disclosure;

FIG. 4B schematically shows a S-Graph modeling the hand imaged in the video frame shown in FIG. 4A, in accordance with an embodiment of the disclosure;

DETAILED DESCRIPTION

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Wherever a general term in the disclosure is illustrated by reference to an example instance or a list of example instances, the instance or instances referred to, are by way of non-limiting example instances of the general term, and the general term is not intended to be limited to the specific example instance or instances referred to. The phrase "in an embodiment", whether or not associated with a permissive, such as "may", "optionally", or "by way of example", is used to introduce for consideration an example, but not necessarily a required configuration of possible embodiments of the disclosure. Unless otherwise indicated, the word "or" in the description and claims is considered to be the inclusive "or" rather than the exclusive or, and indicates at least one of, or any combination of more than one of items it conjoins.

Figure 1:
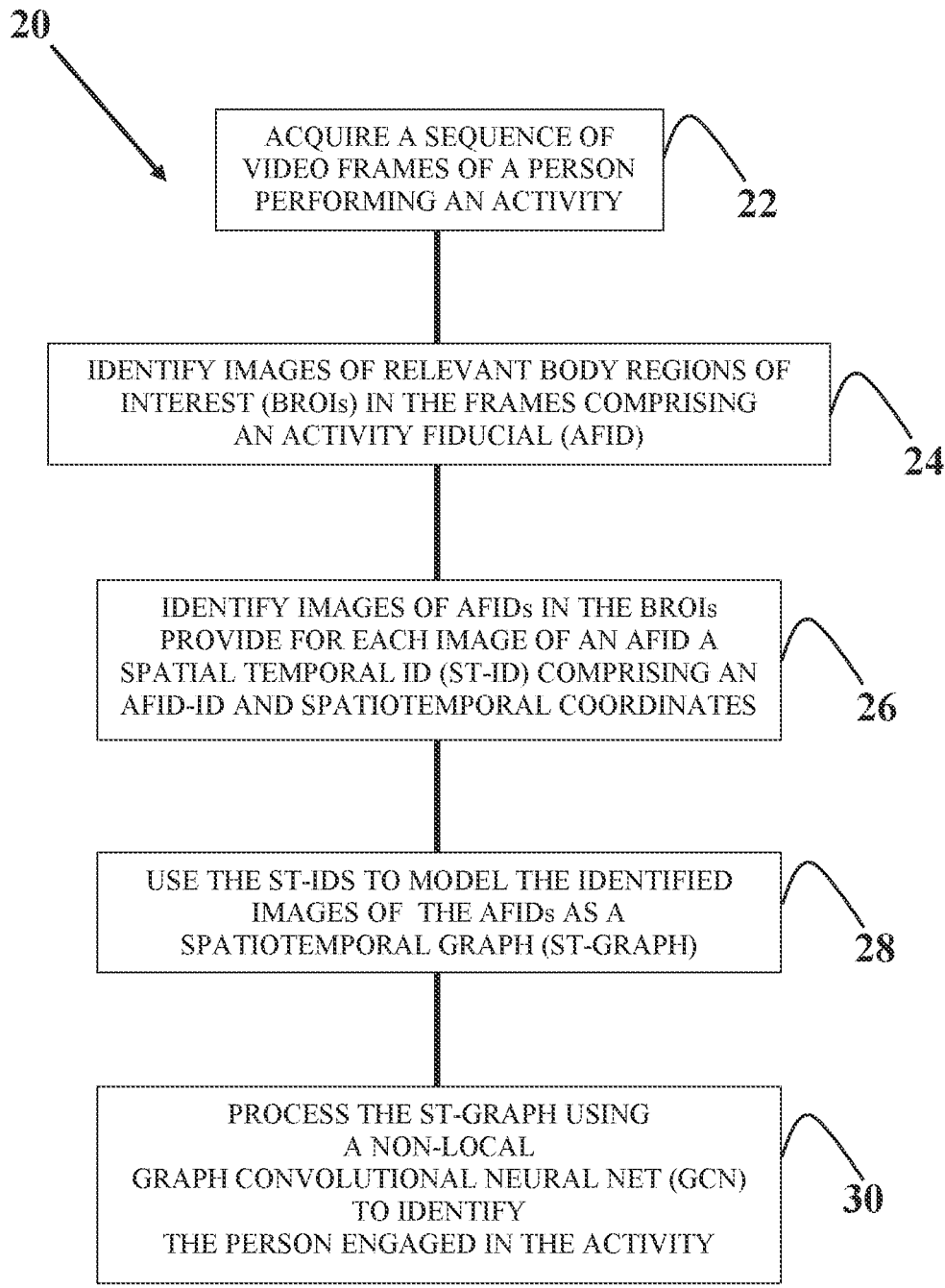
FIG. 1 shows a flow diagram illustrating a process by which DYNAMIDE may process a sequence of video frames of a person performing an activity to identify the person, in accordance with an embodiment of the disclosure.

FIG. 1 shows a high level flow diagram 20 illustrating a process, optionally also referred to by the numeral 20, by which DYNAMIDE may operate to identify a person responsive to an activity that the person performs, in accordance with an embodiment of the disclosure.

In a block 22 DYNAMIDE optionally acquires a sequence of video frames of a person engaged in an activity that DYNAMIDE is configured to process to determine an identity for the person engaged in the activity, in accordance with an embodiment of the disclosure. In a block 24 DYNAMIDE processes the video frames to identify images of body regions of interest (BROIs) in the video frames that image at least one AFID related to the activity. Identifying a BROI in a video frame optionally comprises determining at least one bounding box in the frame that includes an image of the BROI. In a block 26 DYNAMIDE processes each of the bounding boxes determined for the video frames to identify in each of the bounding boxes an image of the at least one AFID. Identifying an image of an AFID in a bounding box of a video frame optionally comprises associating with the image a spaciotemporal ID (ST-ID) comprising an identifying label of the AFID, an "AFID ST-ID", which is used to label all identified images of the same AFID in the video frames and determining spatiotemporal coordinates for the image. The spatiotemporal coordinates comprise a time stamp and at least two spatial coordinates. The time stamp identifies a time, a temporal location, at which the video frame comprising the bounding box in which the AFID is located was acquired relative to times at which other video frames in the sequence of video frames were acquired. The at least two spatial coordinates correspond to a spatial location of the AFID at a time indicated by the time stamp. Optionally, the AFID ST-ID for a given identified AFID comprises a standard deviation (sd) for each spatial coordinate and a probability that the AFID-ID label associated with the AFID ST-ID is correct. An earliest and latest time stamp and extreme spatial coordinates determined for the AFID ST-IDs determine a space-time volume, which may be referred to as a spatiotemporal AFID hull (ST-Hull), that contains the spatiotemporal coordinates of all instances of the AFIDs imaged and identified in the sequence of video frames.

In a block 28 DYNAMIDE uses the ST-IDs of the AFIDS to configure the identified instances of the AFIDs as nodes of an AFID spatiotemporal graph (ST-Graph) that are connected by spatial and temporal edges. Spatial edges connect ST-Graph nodes that represent imaged instances of AFIDs identified by a same time stamp, that is instances of AFIDs that are imaged in a same video frame, and represent spatial constraints imposed on the AFIDs by structure of a person's body. The configuration of nodes connected by spatial edges that represent spatial relations of instances of AFIDs imaged in a same given frame and given time may be referred to as a spatial graph (S-Graph) of the AFIDs at the given time. Temporal edges connect temporally adjacent nodes in the ST-Graph representing images of the same AFID in two consecutively acquired video frames in the sequence of video frames. Temporal edges represent an elapsed time between two consecutive time stamps. The ST-Graph may be considered to comprise S-Graphs for the AFIDs connected by temporal edges.

In an embodiment, in a block 30 DYNAMIDE processes the AFID ST-Graph using, an optionally adaptive, non-local graph convolutional neural net, an ANLGCN, to determine, optionally in real time, which person from amongst a plurality of persons that the ANLGCN was trained to recognize, is engaged or engaging in the activity. In an embodiment the ANLGCN is configured to span the AFID ST-Hull and enable data associated with an imaged instance of an AFID at any spatiotemporal location in the hull to be weighted by a learned weight and contribute to a convolution performed by the ANLGCN for a spatiotemporal location anywhere else in the hull. Optionally, the NLGCN is configured as a multi-stream GCN comprising a plurality of component NLGCNs that operate to process sets of AFID data characterized by independent degrees of freedom.

Figure 2:
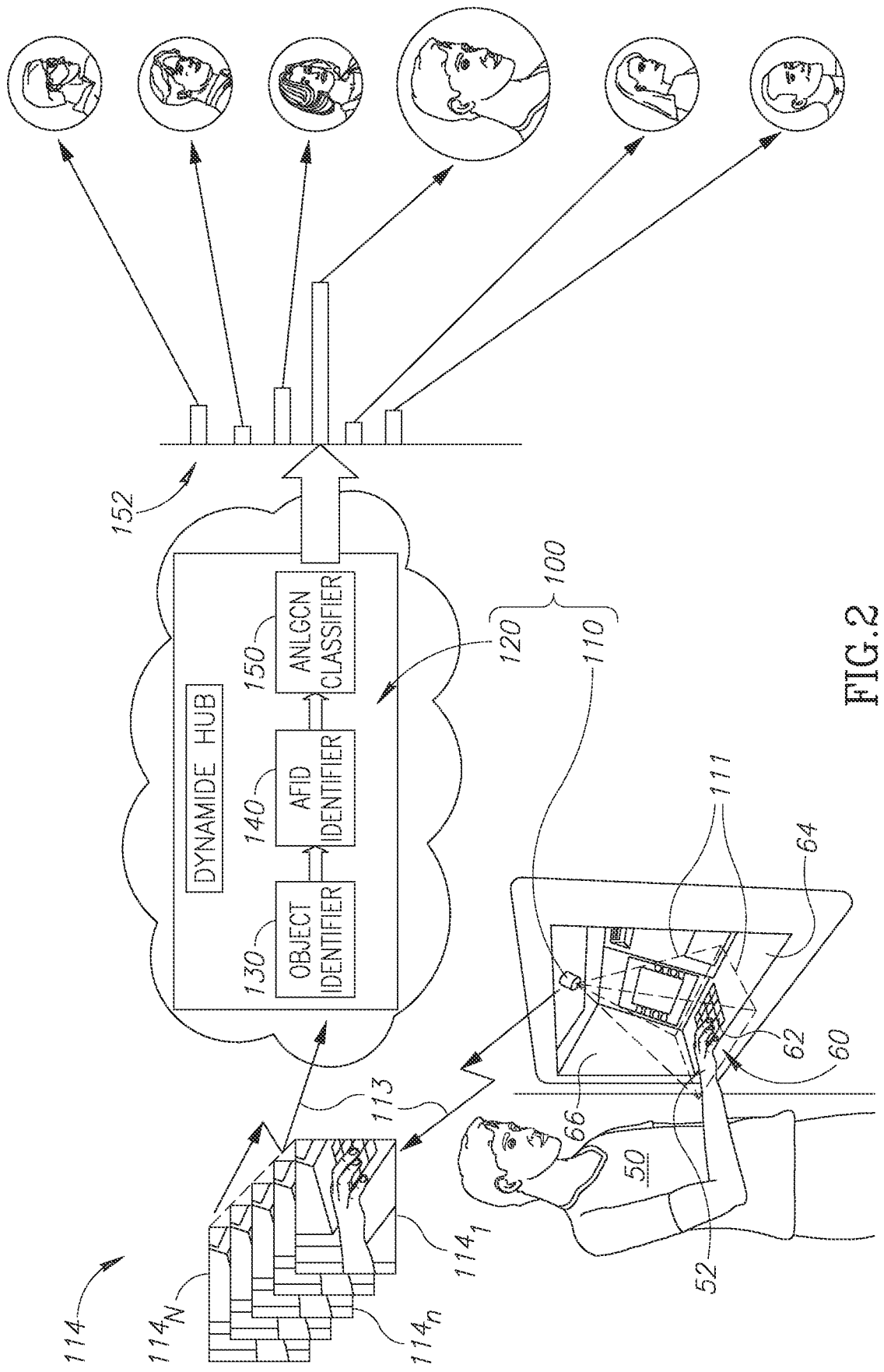
FIG. 2 schematically shows a DYNAMIDE system processing a sequence of video frames of a person typing on an ATM (automated teller machine) keypad to identify the person, in accordance with an embodiment of the disclosure.

FIG. 2 schematically shows a DYNAMIDE system 100 configured to execute the process shown in FIG. 1 and identify a person engaged in an activity by the way in which the person performs the activity, in accordance with an embodiment of the disclosure. DYNAMIDE system 100 may comprise an, optionally cloud based, processing hub 120 an imaging system 110 having a field of view (FOV) indicated by dashed lines 111. In the figure, by way of example, the activity is typing on a keypad 62 engaged in by a person 50 at an ATM 60.

Imaging system 110 is operable to provide a video sequence 114 of a plurality of "N" 2D and/or 3D video frames $114_n$, $1 \leq n \leq N$, of a hand or hands 52 of person 50 typing on keypad 62. Imaging system 110 is connected by at least one wireline and/or wireless communication channel 113 to hub 120, via which imaging system 110 transmits video frames it acquires to the hub. Hub 120 is configured to process the received video frames $114_n$ to identify person 50 whose hand 52 is imaged in the video frames. The hub comprises and/or has access to data and/or executable instructions, hereinafter also referred to as software, and to any of various electronic and/or optical physical, and/or virtual, processors, memories, and/or wireline or wireless communication interfaces, hereinafter also referred to as hardware, that may be required to support functionalities that the hub provides.

By way of example, hub 120 comprises software and hardware that support an object detection module 130 operable to detect BROIs in video frames $114_n$, an AFID identifier module 140 for identifying AFIDs in detected BROIs and providing each identified AFID with a ST-ID, and a classifier module 150 comprising a non-local classifier operable to process the set of ST-IDs as a spatiotemporal graph to identify person 50.

In an embodiment object BROI detector module 130 comprises a fast object detector, such as a YOLO (You Look Only Once) detector that is capable of detecting relevant BROIs in real time. AFID identifier module 140 may comprise a convolutional pose machine (CPM) for identifying AFIDs in the detected BROIs. Classifier module 150 comprises an, optionally adaptive, non-local graph convolutional network noted above and discussed below. In FIG. 2 classifier module 150 is schematically shown providing an output of probabilities represented by a histogram 152. The histogram gives a probability for each given person of a plurality of persons DYNAMIDE 100 was trained to recognize that the given person is the person whose hand 52 is imaged typing in the video frames. DYNAMIDE 100 is schematically shown as successfully identifying person 50 as the person whose hand 52 is imaged typing in video frames $114_n$.

Figures 3A, 3B:
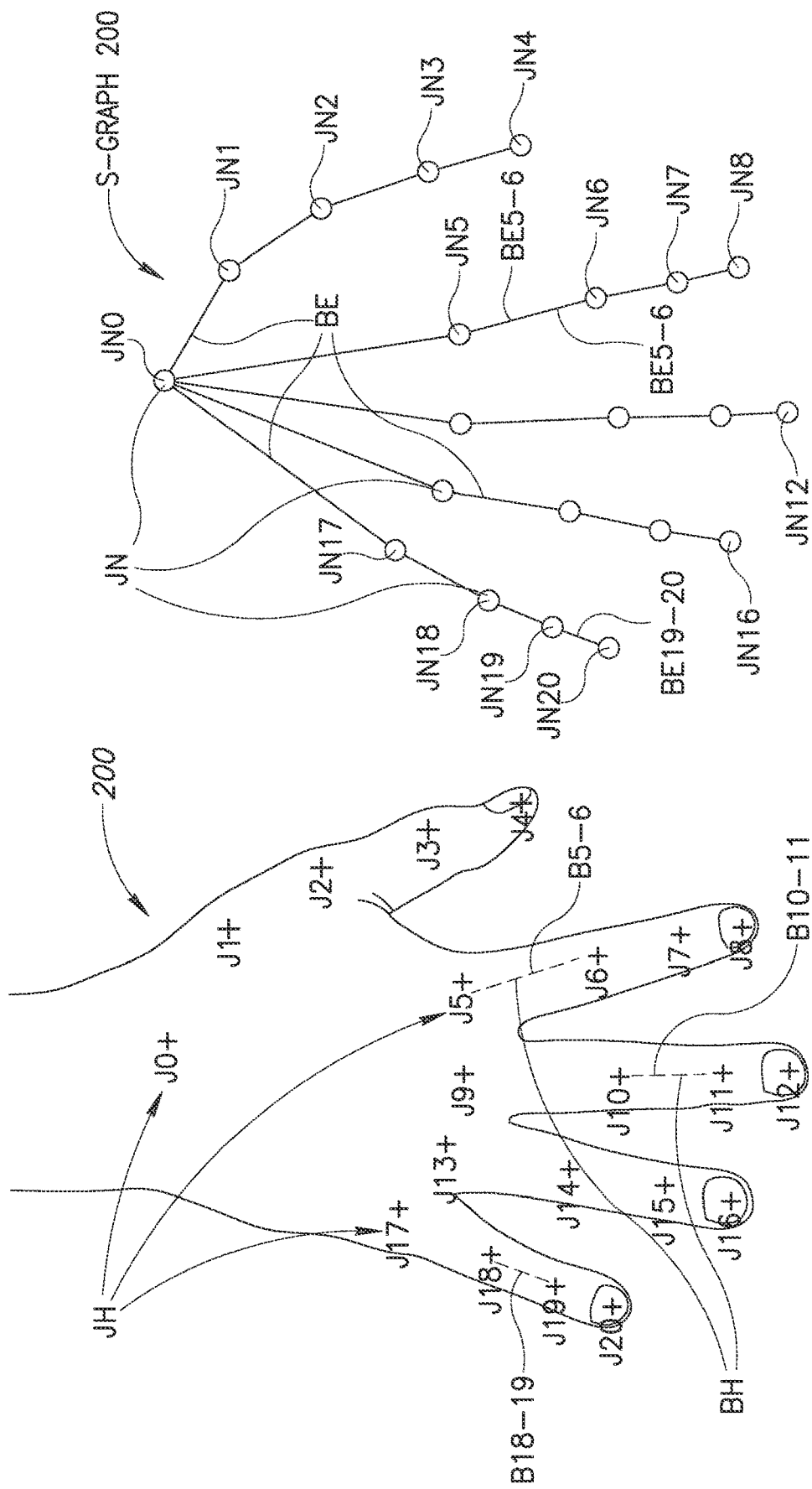
FIG. 3A schematically shows an image of a hand and AFIDs of the hand that DYNAMIDE may use to identify a person typing on a keyboard, in accordance with an embodiment of the disclosure.
FIG. 3B schematically shows a spatial graph, an S-Graph, modeling the hand shown in FIG. 3A, in accordance with an embodiment of the disclosure.

In an embodiment the AFIDs that DYNAMIDE 100 uses to identify a person typing are joints (finger and/or wrist joints) and finger bones (phalanges) of the typing hand. FIG. 3A schematically shows an image of a hand 200 having finger joints, also referred to as knuckles, and wrist joints that are optionally used as AFIDs by DYNAMIDE 100 for processing video images of a typing hand in accordance with an embodiment of the disclosure. The joints have locations on hand 200 indicated by plus signs, "+", and as shown in the figure may generically be referenced by a hand joint label "JH", and individually distinguished by numeral labels J0, J1, . . . J20. A given phalange that DYNAMIDE 100 may use as an AFID for the typing activity is identified when referenced by an alphanumeric label that indicates the two knuckles that the given phalange connects. For example in FIG. 3A a finger bone that connects joints J5 and J6 is schematically indicated in FIG. 3A by a dashed line labeled B5-6 and finger bone B18-19 connects knuckles J18 and J19. Finger bones may generically be referenced by a label BH.

FIG. 3B schematically shows a spatial graph, S-Graph 200, that may be used to represent the spatial relations for AFIDs at given time and is shown by way of example for hand 200 at the given time at which hand 200 was imaged, in accordance with an embodiment of the disclosure. In spatial S-Graph 200 knuckle AFIDs JH shown in FIG. 3A, are represented by nodes generically referenced by a label JN. Nodes JN are individually distinguished by alphanumeric labels JN0, JN1, JN20 respectively corresponding to homologous knuckles J0, J1, . . . J20 shown in FIG. 3A. Edges of S-Graph 200 that connect nodes JN represent finger bones, that is bone AFIDs, which connect the knuckles. As indicated in FIG. 3B the edges may generically be referenced by a label BE and are individually referenced by reference labels corresponding to homologous finger bones in hand 200. For example, edge BE5-6 in FIG. 3B corresponds to bone B5-6 in FIG. 3A.

FIG. 4A schematically shows an enlarged image of an n-th video frame $114_n$ of the sequence 114 (FIG. 2) of video frames that is acquired by imaging system 110 at an acquisition time $t_n$ and transmitted to DYNAMIDE hub 120 for processing in accordance with an embodiment of the disclosure. Video frame $114_n$ images hand 52 typing on keypad 62 as well as features in an environment surrounding the hand that may be located in FOV 111 (FIG. 2) of imaging system 110. The surrounding features as schematically shown in FIG. 4A may for example include portions of the structure of ATM 60 such as a counter 64 and side walls 66, as well as a mobile phone 55 that person 50 has placed on counter 64.

As discussed above, in processing sequence 114 of video frames $114_n$ object detection module 130 may determine bounding boxes that locate images of hand 52 in the frames as objects comprising joint AFIDs that AFID detector 140 identifies and DYNAMIDE 100 uses to identify person 50. A bounding box determined by object detector module 130 for hand 52 in video frame $114_n$ is indicated by a dashed rectangle 116. Knuckle AFIDs that AFID detector 140 detects in bounding box 116 and identifies are indicated by the generic AFID labels JH FIG. 3A. FIG. 4B schematically shows a spatial S-Graph-52($t_n$) that models hand 52 as a graph based on the image of the hand in video frame $114_n$ acquired at the acquisition time $t_n$. The knuckle nodes in S-Graphs-52($t_n$) may be indicated by the appropriate knuckle node label, JN0, JN1, JN20 with an addition of an argument indicating the acquisition time $t_n$ associated with S-Graph-52($t_n$) to which the node belongs. For example, nodes JN0, JN1, JN20 in S-Graph 52($t_n$) may be referenced JN0($t_n$), JN1($t_n$), . . . , JN20($t_n$).

Figures 5A, 5B:
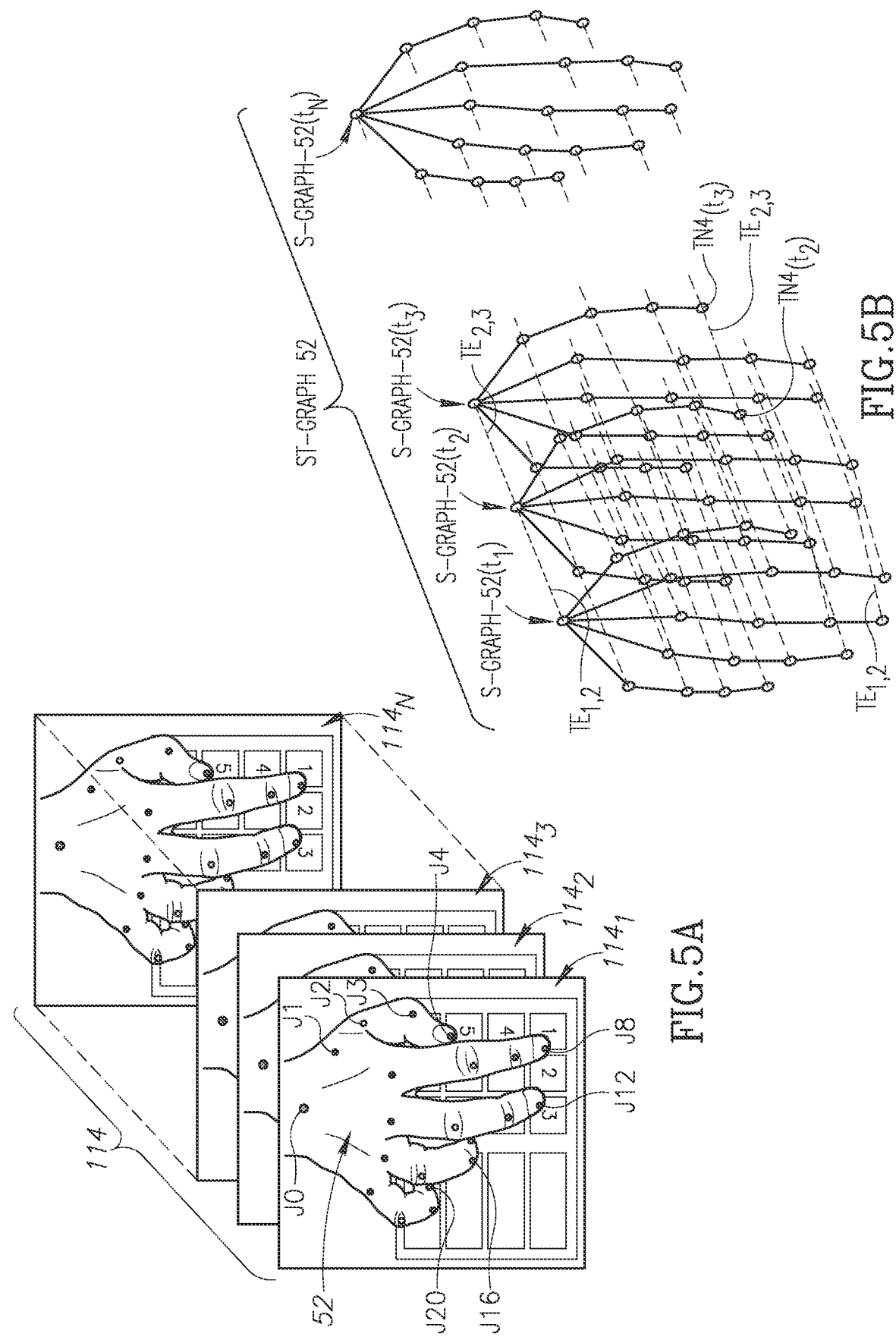
FIG. 5A schematically shows an enlarged image of the sequence of video frames shown in FIG. 2 in accordance with an embodiment of the disclosure.
FIG. 5B schematically shows a spatiotemporal graph ST-Graph, corresponding to the image of the video frame sequence shown in FIG. 5A, in accordance with an embodiment of the disclosure.

FIG. 5A schematically shows an enlarged image of video sequence 114 shown in FIG. 2 comprising video frames $114_1$, $114_2$, $114_3$, . . . , $114_N$ that image hand 52 typing at ATM 60 at respective times $t_1$, $t_2$, $t_3$, . . . , $t_N$. FIG. 5B schematically shows an ST-Graph 52 that models a spatiotemporal development of the typing activity based on images of hand 52 in video frames $114_1$-$114_N$ in accordance with an embodiment of the disclosure. ST-Graph 52 comprises spatial S-Graphs-52($t_n$), 1≤n≤N, corresponding to images of hand 52 in video frames $114_1$, . . . , $114_N$. Homologous nodes JN in adjacent S-Graphs, S-Graph-52($t_n$) and S-Graph-52($t_{n+1}$), are connected by temporal edges representing an elapsed time between their respective acquisition times $t_n$ and $t_{n+1}$. All the temporal edges between adjacent S-Graph-52($t_n$) and S-Graph-52($t_{n+1}$) have a same temporal length and are labeled $TE_{n, n+1}$. Some of the temporal edges in FIG. 5B are labeled by their respective labels.

Figure 6A:
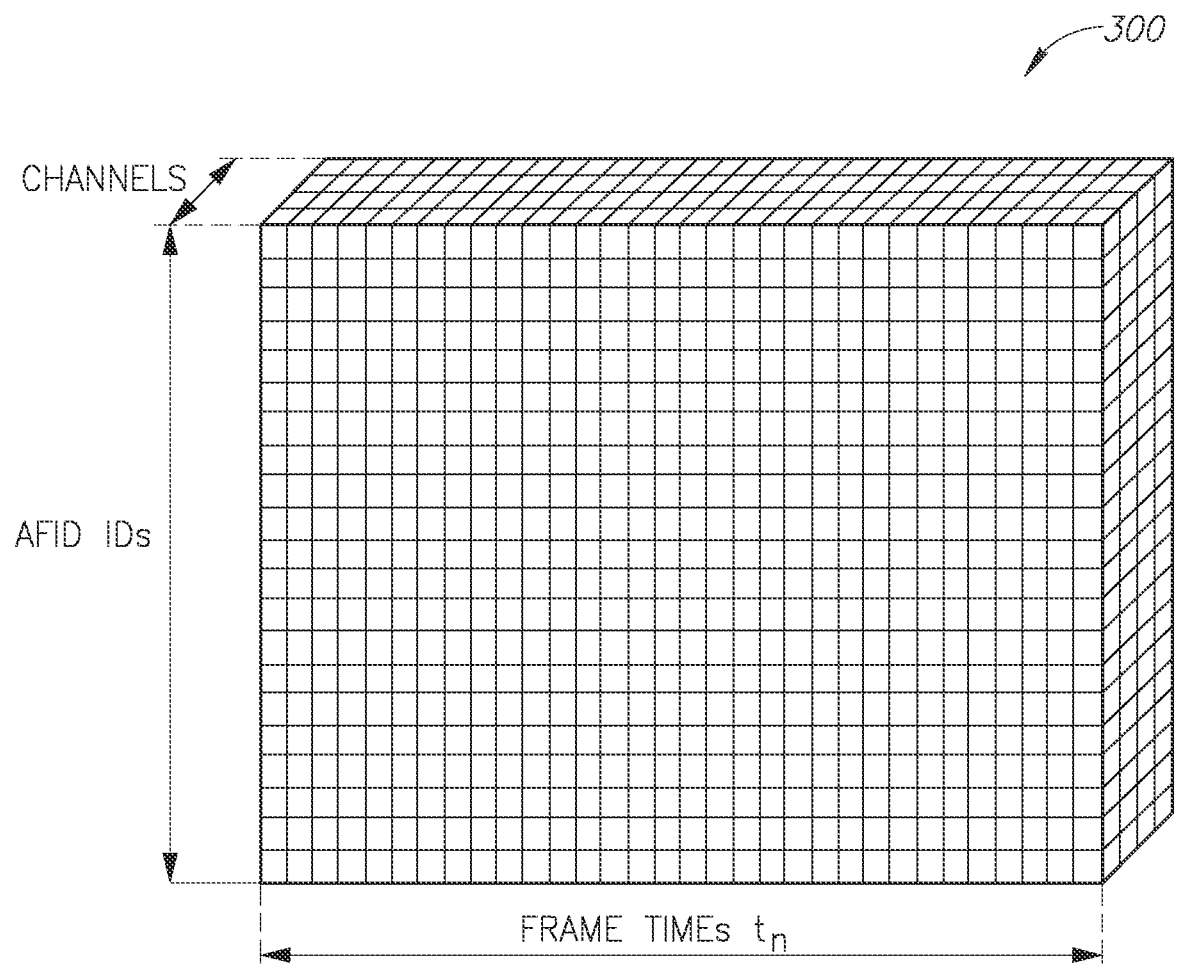
FIG. 6A shows a schematic spatiotemporal feature tensor comprising data associated nodes of the ST-Graph shown in FIG. 5B, in accordance with an embodiment of the disclosure.

The node data associated with ST-Graph-52 provides a set of spatiotemporal input features that classifier module 150 of DYNAMIDE hub 120 processes to determine the identity of person 50 typing on keypad 62 of ATM 60. The set of input features may be modeled as schematically shown in FIG. 6A as an input spatiotemporal feature tensor 300, having AFID, time, and channel axes that indicate a location in the tensor by row, column, and depth. For ST-Graph-52 the AFID axis is calibrated in node number indicating a particular joint in hand 52 and the time axis is calibrated by a sequential frame number or frame acquisition time. By way of example, it is noted that whereas the channel axis of spatiotemporal feature tensor 300 schematically shows four channels, a spatiotemporal feature tensor in accordance with an embodiment may have more or less than four channels. For example, entries along the channel axis for a given node and given time respectively indicated along the AFID and time axes may provide two or three spatial coordinates that determine a spatial location for the given node at the given time. Channel entries may also provide error estimates for accuracies of the coordinates and a probability that the given node is correctly identified.

In an embodiment, classifier module 150 may have a classifier comprising at least one non-local graph convolutional net (NLGCN) to process the data in tensor 300 and provide an identity for person 50 in accordance with an embodiment of the disclosure. Optionally, the at least one NLGCN comprises at least one adaptive ANLGCN which includes in addition to a non-local GCN layer an adaptive adjacency matrix. The adaptive adjacency matrix operates to improve classifier recognition of spatiotemporal motion of joints of a hand relative to each other that are not dictated by spatial structure and are idiosyncratic to the manner in which a person performs typing.

Figure 6B:
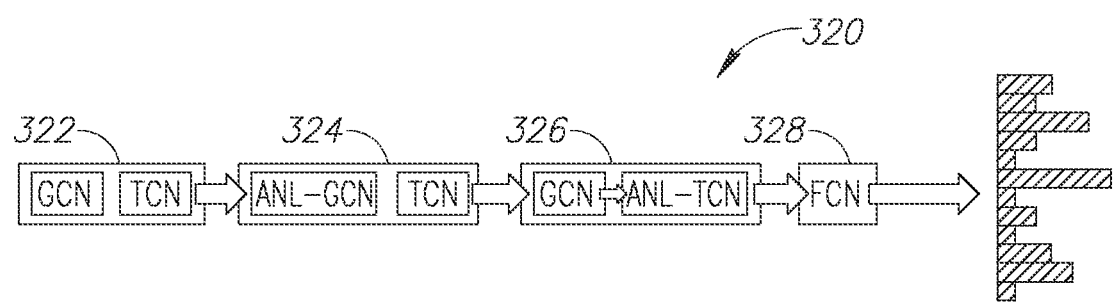
FIG. 6B shows a schema of a non-local neural network that DYNAMIDE may use to process data in the tensor shown in FIG. 6A, in accordance with an embodiment of the disclosure.

By way of example, FIG. 6B shows a schema of a classifier 320 that DYNAMIDE hub 120 may use to process data in tensor 300, in accordance with an embodiment of the disclosure. Classifier 320 optionally comprises convolution neural network blocks 322, 324, and 326 that feed data forward to a fully connected net FCN 328, which provides a probability for each of a plurality of persons as to whether that person is the person whose hand 52 is imaged in video sequence 114 (FIG. 2) typing on keypad 62. Block 322 optionally comprises a GCN that feeds forward data to a time convolutional network (TCN). Block 324 comprises an ANL-GCN that feeds data forward to a TCN, and block 326 comprises a GCN that feeds data forward to an ANL-TCN.

There is therefore provided in accordance with an embodiment of the disclosure, a method of identifying a person, the method comprising: acquiring spatiotemporal data for each of a plurality of anatomical landmarks associated with an activity engaged in by a person that provide data defining at least one spatiotemporal trajectory of the anatomical landmarks during the activity; modeling the acquired spatiotemporal data as a spatiotemporal graph (ST-Graph); and processing the ST-Graph using at least one non-local graph convolution neural network (NLGCN) to provide an identity for the person. Optionally, the at least one NLGCN comprises at least one adaptive NLGCN (ANLGCN) including an adaptive adjacency matrix learned responsive to data relating anatomical landmarks of the plurality of anatomical landmarks that is not dictated solely by the person's physical body structure. Additionally or alternatively, processing the ST-Graph comprises segmenting the plurality of anatomical landmarks into a plurality of sets of anatomical landmarks, each set characterized by a different configuration of degrees of freedom of motion. Optionally the method comprises modeling the acquired spatiotemporal data associated with the anatomical landmarks in each set as a ST-Graph. Processing may comprise processing the ST-Graph modeled for each set of the plurality of sets of anatomical landmarks with an NLGCN of the at least one NLGCN independent of processing the other sets of the plurality of sets to determine data indicating an identity for the person. The method optionally comprises fusing the determined data from all the sets to provide the identity for the person.

In an embodiment acquiring the spatiotemporal data comprises acquiring a sequence of video frames imaging the person engaging in the activity, each video frame including an image of at least one body region of interest (BROI) imaging an anatomical landmark of the plurality of anatomical landmarks. Optionally the method comprises processing the video frames to detect in each video frame the at least one BROI. Additionally or alternatively the method optionally comprises identifying in each of the at least one detected BROI an image of an anatomical landmark of the plurality of anatomical landmarks. Optionally, the method comprises processing the images of the identified anatomical landmarks to determine the data defining the spatiotemporal trajectories.

In an embodiment the plurality of anatomical landmarks comprises joints. Optionally, the plurality of anatomical landmarks comprises bones connecting the joints. Additionally or alternatively the joints comprise finger knuckles. Optionally, the activity comprises a sequence of finger manipulations. The finger manipulations may comprise manipulations engaged in to operate a keyboard.

In an embodiment the joints comprise joints of the large appendages. Optionally the activity is a sport. Optionally the sport is soccer. Optionally, the sport is golf.

In an embodiment the plurality of anatomical landmarks comprises facial landmarks. Optionally, the facial landmarks comprise facial landmarks whose motions are used to define action units (AUs) of the facial action coding system (FACS) used to taxonomize facial expressions and micro-expressions. In an embodiment the plurality of anatomical landmarks comprises minutia pair features of fingerprints of a plurality of fingers of a hand.

There is further provided in accordance with an embodiment a system for identifying a person, the system comprising: an imaging system operable to acquire a video having video frames imaging a person engaging in an activity; and software useable to process the video frames in accordance with any of the preceding claims to provide an identity for the person.

Descriptions of embodiments of the invention in the present application are provided by way of example and are not intended to limit the scope of the invention. The described embodiments comprise different features, not all of which are required in all embodiments. Some embodiments utilize only some of the features or possible combinations of the features. Variations of embodiments of the invention that are described, and embodiments comprising different combinations of features noted in the described embodiments, will occur to persons of the art. The scope of the invention is limited only by the claims.

The invention claimed is:

1. A method of identifying a person, the method comprising:
   acquiring a sequence of video images of the person performing an activity;
   identifying in the sequence of video images, anatomical landmarks that exhibit various degrees of motion associated with the activity engaged in by the person;
   determining spatiotemporal trajectories exhibited by the identified anatomical landmarks in the sequence of video images;
   constructing a spatiotemporal graph (ST-Graph) representing the spatiotemporal trajectories exhibited by the identified anatomical landmarks; and
   processing the ST-Graph using at least one non-local graph convolution neural network (NLGCN) to provide an identity for the person.

2. The method according to claim 1 wherein the at least one NLGCN comprises at least one adaptive NLGCN (ANLGCN) including an adaptive adjacency matrix learned responsive to data relating anatomical landmarks of the identified anatomical landmarks that is not dictated solely by the person's physical body structure.

3. The method according to claim 1, wherein each video frame includes an image of at least one body region of interest (BROI) imaging an anatomical landmark of the identified anatomical landmarks.

4. The method according to claim 3 and comprising processing the video frames to detect in each video frame the at least one BROI.

5. The method according to claim 3 and comprising identifying in each of the at least one detected BROI an image of an anatomical landmark of the identified anatomical landmarks.

6. The method according to claim 5 and comprising processing the images of the identified anatomical landmarks to determine the data defining the spatiotemporal trajectories.

7. The method according to claim 3 wherein the identified anatomical landmarks comprises joints.

8. The method according to claim 7 wherein the identified landmarks comprises bones connecting the joints.

9. The method according to claim 7 wherein the joints comprise finger knuckles.

10. The method according to claim 9 wherein the activity comprises a sequence of finger manipulations.

11. The method according to claim 10 wherein the finger manipulations comprise manipulations engaged in to operate a keyboard.

12. The method according to claim 7 wherein the joints comprise joints of the large appendages.

13. The method according to claim 12 wherein the activity is a sport.

14. The method according to claim 13 wherein the sport is soccer.

15. The method according to claim 13 wherein the sport is golf.

16. A method of identifying a person, the method comprising:
    acquiring a sequence of video images of the person performing an activity;
    identifying in the sequence of video images anatomical landmarks that exhibit various degrees of motion associated with the activity engaged in by the person;
    determining spatiotemporal trajectories exhibited by the identified anatomical landmarks in the sequence of video images, wherein the identified anatomical landmarks comprises facial landmarks;

constructing a spatiotemporal graph (ST-Graph) representing the spatiotemporal trajectories exhibited by the identified anatomical landmarks; and processing the ST-Graph using at least one non-local graph convolution neural network (NLGCN) to provide an identity for the person.

17. The method according to claim 16 wherein the facial landmarks comprise facial landmarks whose motions are used to define action units (AUs) of the facial action coding system (FACS) used to taxonomize facial expressions and micro-expressions.

18. The method according to claim 16 wherein the plurality of anatomical landmarks comprises minutia pair features of fingerprints of a plurality of fingers of a hand.

* * * * *